US012586969B2

(12) United States Patent
Paulsen et al.

(10) Patent No.: US 12,586,969 B2
(45) Date of Patent: Mar. 24, 2026

(54) PUNCHDOWN TOOL

(71) Applicant: Milwaukee Electric Tool Corporation, Brookfield, WI (US)

(72) Inventors: Alexander J. Paulsen, Milwaukee, WI (US); James A. Cemke, Jr., Richfield, WI (US); Eric J. Williams, Grafton, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 412 days.

(21) Appl. No.: 18/054,297

(22) Filed: Nov. 10, 2022

(65) Prior Publication Data

US 2023/0073498 A1 Mar. 9, 2023

Related U.S. Application Data

(63) Continuation of application No. 17/246,131, filed on Apr. 30, 2021, now Pat. No. 11,509,106, which is a (Continued)

(51) Int. Cl.
*H01R 43/01* (2006.01)
*B25B 27/00* (2006.01)
*H01R 43/28* (2006.01)

(52) U.S. Cl.
CPC ........... *H01R 43/015* (2013.01); *B25B 27/00* (2013.01); *H01R 43/28* (2013.01)

(58) Field of Classification Search
CPC ...... H01R 43/015; H01R 43/28; H01R 43/01; B25B 27/00
See application file for complete search history.

(56) References Cited

U.S. PATENT DOCUMENTS 1,855,025 A * 4/1932 Kott ..................... B25D 11/102 74/55
2,285,384 A * 6/1942 Schott ..................... B25C 3/002 227/142
(Continued)

FOREIGN PATENT DOCUMENTS

CN 2501223 7/2002
CN 2762394 3/2006
(Continued)

OTHER PUBLICATIONS

Translation of DE 19616912 (Year: 1997).*
(Continued)

*Primary Examiner* — Jeffrey T Carley
(74) *Attorney, Agent, or Firm* — Reinhart Boerner Van Deuren s.c.

(57) ABSTRACT

A punchdown tool for fitting wires into connectors including a housing with a front side, a back side, a front end, a rear end opposite the front end, a leading surface on the front end, and an interior defined between the front and back sides. The punchdown tool also includes a drive mechanism with a hammer, an anvil, and a drive spring. The drive mechanism is positioned in the interior of the housing adjacent the front end. The punchdown tool further includes a circuit board positioned in the interior of the housing adjacent the rear end with a controller. The punchdown tool also includes a light positioned on the leading surface of the housing that is electrically coupled to the controller and at least one battery positioned in the interior of the housing for supplying power to the light and the circuit board.

8 Claims, 12 Drawing Sheets

Related U.S. Application Data continuation of application No. 15/940,195, filed on Mar. 29, 2018, now Pat. No. 10,998,687.

(60) Provisional application No. 62/487,246, filed on Apr. 19, 2017, provisional application No. 62/478,431, filed on Mar. 29, 2017.

(56) References Cited

U.S. PATENT DOCUMENTS

| | | | | | |
|---|---|---|---|---|---|
| 2,421,354 | A | * | 5/1947 | Reiter | A61C 3/08 606/100 |
| 2,437,014 | A | | 3/1948 | Arnesen | |
| 2,602,360 | A | * | 7/1952 | Berninger | B25D 5/00 30/367 |
| 2,725,878 | A | * | 12/1955 | Reiter | A61B 17/1604 606/100 |
| 2,787,179 | A | * | 4/1957 | Warner | B25D 5/02 30/367 |
| 2,960,864 | A | * | 11/1960 | Watts | H01R 43/26 81/463 |
| 3,029,512 | A | * | 4/1962 | Saxton | B25D 5/02 30/367 |
| 3,074,155 | A | | 1/1963 | Cootes et al. | |
| 3,327,623 | A | * | 6/1967 | Diegel | B44B 5/0085 101/93.13 |
| 3,708,852 | A | | 1/1973 | Mason | |
| 3,711,921 | A | | 1/1973 | Debortoli et al. | |
| 3,742,573 | A | * | 7/1973 | Kaufman | H01R 43/015 30/367 |
| 3,883,316 | A | * | 5/1975 | Mason | H01R 43/015 29/566.4 |
| 3,896,534 | A | | 7/1975 | Kaufman et al. | |
| 3,995,363 | A | * | 12/1976 | Medina, Jr. | G02B 6/3846 29/280 |
| 4,161,061 | A | | 7/1979 | Mason et al. | |
| 4,241,496 | A | * | 12/1980 | Gregson | H01R 43/027 29/566.4 |
| 4,300,282 | A | * | 11/1981 | Bunyea | H01R 43/015 173/15 |
| 4,327,485 | A | * | 5/1982 | Rix | H01R 43/015 29/751 |
| 4,408,391 | A | | 10/1983 | Pohl | |
| 4,656,725 | A | | 4/1987 | Knickerbocker | |
| 4,919,216 | A | | 4/1990 | Ikegami | |
| 5,175,921 | A | * | 1/1993 | Krietzman | H01R 43/015 29/566.4 |
| 5,195,230 | A | * | 3/1993 | Krietzman | H01R 43/015 29/566.4 |
| 5,604,948 | A | | 2/1997 | McMahon et al. | |
| 5,636,427 | A | * | 6/1997 | Lyle | B25B 31/00 227/15 |
| 5,666,715 | A | * | 9/1997 | Zoiss | H05K 13/06 29/566.4 |
| 5,813,109 | A | * | 9/1998 | Ziegler | H01R 43/015 29/566.4 |
| 6,058,600 | A | | 5/2000 | Leu | |
| 6,370,993 | B1 | | 4/2002 | Pitstick | |
| 6,615,480 | B1 | | 9/2003 | Murphy | |
| 6,785,950 | B1 | * | 9/2004 | Scirbona | B25D 11/102 29/566.4 |
| 7,096,564 | B2 | | 8/2006 | Sullivan | |
| 7,266,878 | B1 | | 9/2007 | Sullivan | |
| 7,475,475 | B2 | | 1/2009 | Sullivan | |
| 7,621,040 | B2 | | 11/2009 | Sullivan | |
| 7,708,739 | B2 | | 5/2010 | Kilburn et al. | |
| 8,220,135 | B2 | | 7/2012 | Vogel et al. | |
| 8,443,508 | B2 | | 5/2013 | Vogel et al. | |
| 8,549,727 | B2 | | 10/2013 | Lee et al. | |
| 8,856,994 | B2 | | 10/2014 | Powers | |
| 10,312,653 | B2 | * | 6/2019 | Ballard | H01R 43/0427 |
| 2006/0254054 | A1 | * | 11/2006 | Sullivan | H01R 43/015 29/566.4 |
| 2007/0015394 | A1 | * | 1/2007 | Sullivan | H01R 43/015 439/395 |
| 2007/0143990 | A1 | | 6/2007 | Larkin et al. | |
| 2007/0169332 | A1 | * | 7/2007 | Sullivan | H01R 43/015 29/566.4 |
| 2007/0251086 | A1 | * | 11/2007 | Sullivan | H01R 43/26 29/748 |
| 2008/0098586 | A1 | * | 5/2008 | Muller | H01R 43/015 29/566.4 |
| 2010/0306990 | A1 | | 12/2010 | Vogel et al. | |
| 2013/0031728 | A1 | * | 2/2013 | Yen | H02G 1/1209 7/107 |
| 2014/0123397 | A1 | * | 5/2014 | Powers | B25B 23/0042 7/107 |
| 2016/0028202 | A1 | | 1/2016 | Hoppe et al. | |
| 2018/0287323 | A1 | * | 10/2018 | Paulsen | H01R 43/28 |

FOREIGN PATENT DOCUMENTS

| | | | | | |
|---|---|---|---|---|---|
| CN | 1848552 | A | | 10/2006 | |
| CN | 202079575 | U | | 12/2011 | |
| CN | 104023919 | A | | 9/2014 | |
| CN | 110637398 | | | 11/2021 | |
| DE | 19616912 | C1 | * | 10/1997 | H01R 43/015 |
| EP | 0192432 | A2 | * | 8/1986 | H05K 13/04 |
| GB | 2075903 | A | * | 11/1981 | H01R 43/015 |
| JP | 5013483 | B | | 8/2012 | |
| KR | 20000070364 | A | | 11/2000 | |
| WO | WO-8802935 | A1 | * | 4/1988 | H01R 43/01 |
| WO | WO-9832195 | A1 | * | 7/1998 | H01R 43/015 |

OTHER PUBLICATIONS

Translation of WO 8802935 (Year: 1988).*

International Searching Authority, “International Search Report and Written Opinion,” issued in connection with International Patent Application No. PCT/US2018/025172, mailed on Jul. 17, 2018, 12 pages.

* cited by examiner

PUNCHDOWN TOOL

CROSS-REFERENCE TO RELATED APPLICATIONS

This application is a continuation of U.S. patent application Ser. No. 17/246,131, filed Apr. 30, 2021, which is a continuation of U.S. patent application Ser. No. 15/940,195, now U.S. Pat. No. 10,998,687, filed Mar. 29, 2018, which claims priority to U.S. Provisional Patent Application No. 62/478,431, filed Mar. 29, 2017, and this patent application claims priority to U.S. Provisional Patent Application No. 62/487,246, filed Apr. 19, 2017, which are incorporated by reference herein in their entireties.

BACKGROUND

The present invention relates to hand tools and particularly to punchdown hand tools.

Punchdown tools are used to fit electrical wires into an electrical connector. Punchdown tools typically include an impact-type drive mechanism that drives a blade. The drive mechanism drives the blade with enough force to fit the electrical wire into the electrical connector. Generally, the drive mechanism includes compression springs that when loaded drive a hammer to impact an anvil, thus transferring momentum to the blade to strike the electrical wire. However, many users using punchdown tools need to fit wires in electrical connectors that are in the dark. Additionally, many impact tools are bulky and difficult to hold comfortably.

SUMMARY

In one embodiment, the invention provides a punchdown tool including a housing with a front side, a back side, a front end, a rear end, an impact axis that extends through the housing, and an interior defined between the front and rear sides. The punchdown tool also includes a drive mechanism positioned in the interior of the housing adjacent the front end, a circuit board with a controller positioned in the interior of the housing adjacent the rear end, and at least one battery electrically coupled to the circuit board. The at least one battery is at least partially positioned within the housing adjacent to the circuit board and the rear end. A ratio is defined as a length of the punchdown tool in a direction parallel to the impact axis divided by a length of the drive mechanism in a direction parallel to the impact axis. The ratio is in a range from 1.5 to 2.0.

In another embodiment, the invention provides a punchdown tool including a housing that defines an impact axis that extends through the housing in a longitudinal direction. The housing includes a front side, a back side, a front end, and a rear end opposite the front end. The punchdown tool also includes a drive mechanism positioned in the housing. The drive mechanism is movable between an unloaded position and a loaded position. The drive mechanism includes a hammer that is movable along the impact axis, a drive spring that is compressible in a direction parallel to the impact axis, and an anvil movable along the impact axis. The anvil includes a barrel. When the drive mechanism is in the loaded position the barrel of the anvil does not extend pass the front end of the housing In another embodiment, the invention provides a punchdown tool for fitting wires into connectors including a housing with a front side, a back side, a front end, a rear end opposite the front end, a leading surface on the front end, and an interior defined between the front and back sides. The punchdown tool also includes a drive mechanism with a hammer, an anvil, and a drive spring. The drive mechanism is positioned in the interior of the housing adjacent the front end. The punchdown tool further includes a circuit board positioned in the interior of the housing adjacent the rear end with a controller. The punchdown tool also includes a light positioned on the leading surface of the housing that is electrically coupled to the controller and at least one battery positioned in the interior of the housing for supplying power to the light and the circuit board.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
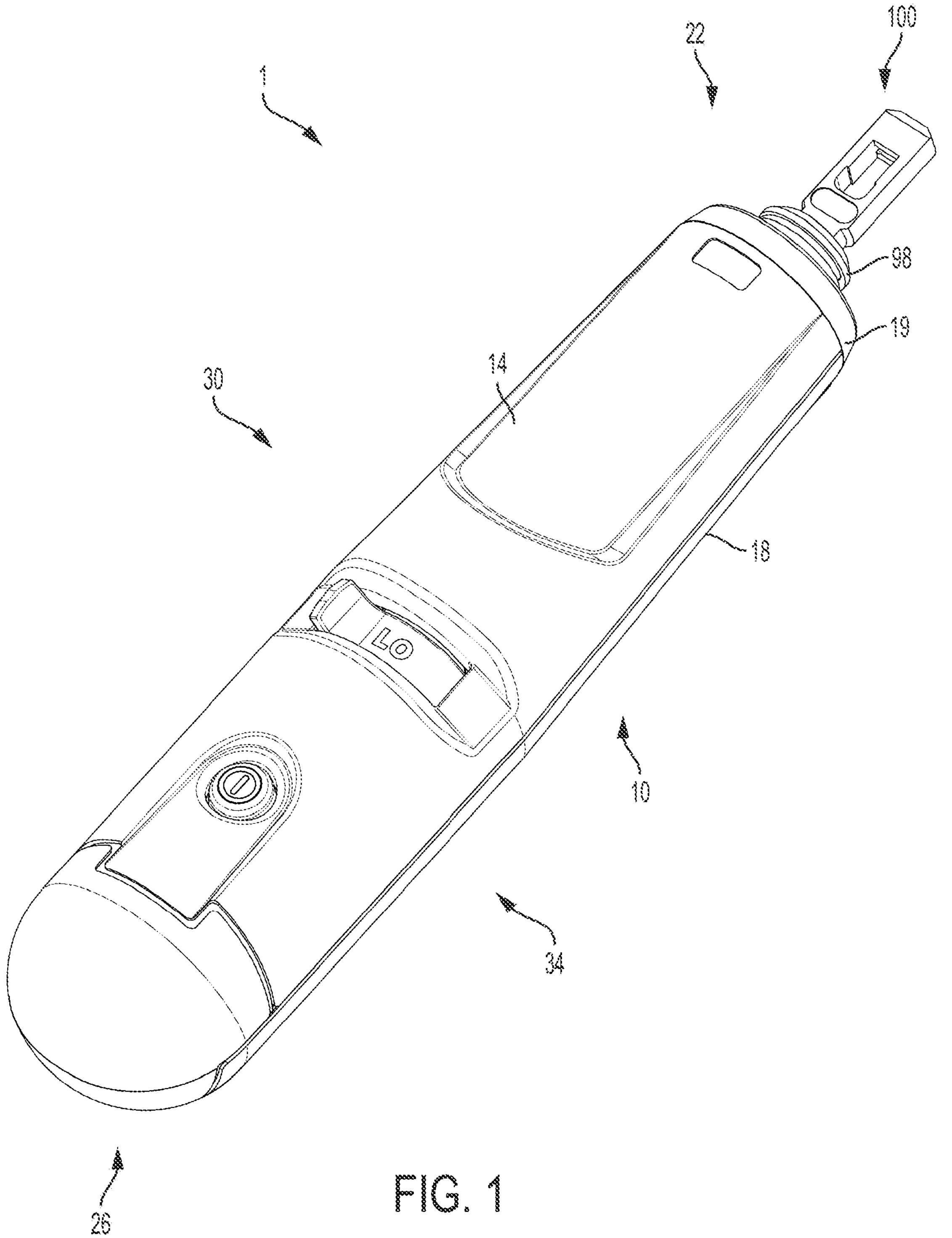
FIG. 1 is a perspective view of a punchdown tool with an insert.
Figure 2:
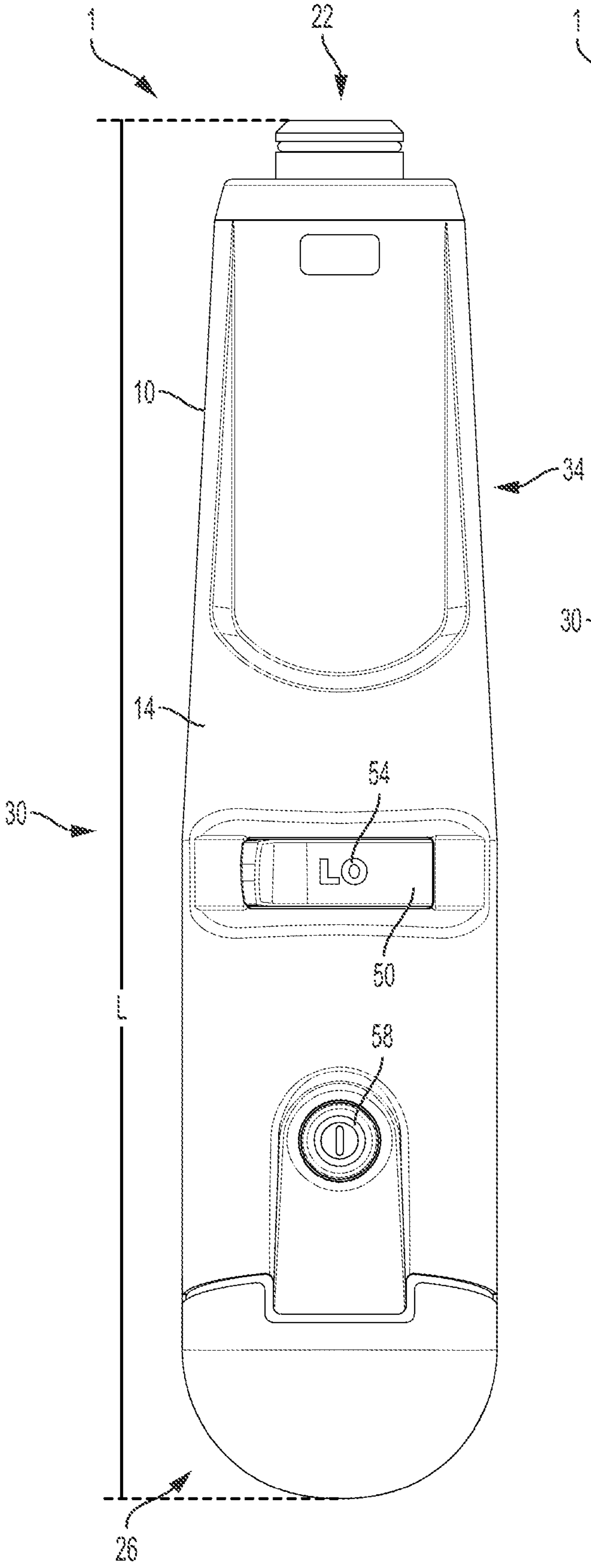
FIG. 2 is a front view of the punchdown tool of FIG. 1 without an insert and with a force impact switch in a first position.
Figure 4:
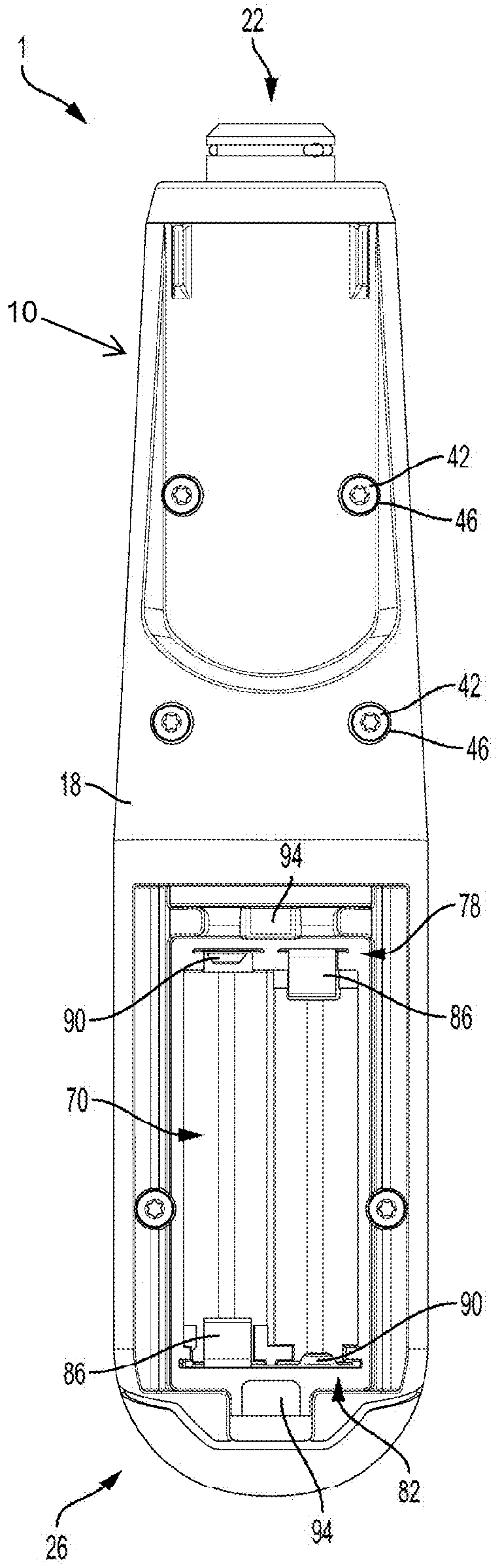
FIG. 4 is a back view of the punchdown tool of FIG. 2 without batteries.
Figure 5:
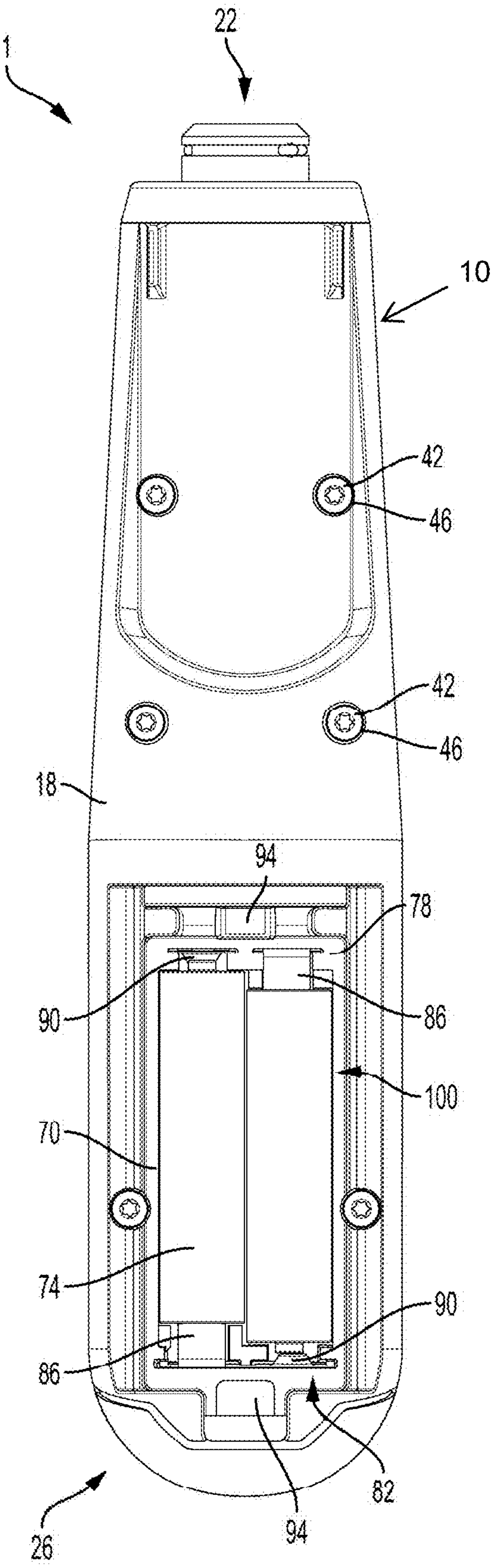
FIG. 5 is a back view of the punchdown tool of FIG. 2 with batteries.

FIG. 1 illustrates a punchdown tool 1. The illustrated punchdown tool 1 is configured to hold and support an insert 100 in the operation of punching down electrical wires into a connector. The punchdown tool 1 includes a housing 10 with a front housing 14, a back housing 18, a nose cone 19, a front end 22, a rear end 26, a first lateral side 30, and a second lateral side 34. The nose cone 19 is positioned at the front end 22 and connects the front housing 14 to the back housing 18. The nose cone 19 includes an opening 21 (FIG. 6) that extends into the interior 174 (FIG. 10) of the housing 10. As shown in FIG. 2, the length L of the impact tool 1 from the front end 22 to the rear end 26 may be between 150 millimeters and approximately 180 millimeters. In some embodiments, the length L of the impact tool 1 is 166.2 millimeters. The punchdown tool 1 further comprises a controller 36 (FIG. 10) to control lights 38 (FIG. 6) at the front end 22 of the housing 10. With reference to FIGS. 4-5, the front housing 14 and the back housing 18 are coupled together using fasteners 42 that are received in fastener slots 46 on the back housing 18.

Figure 3:
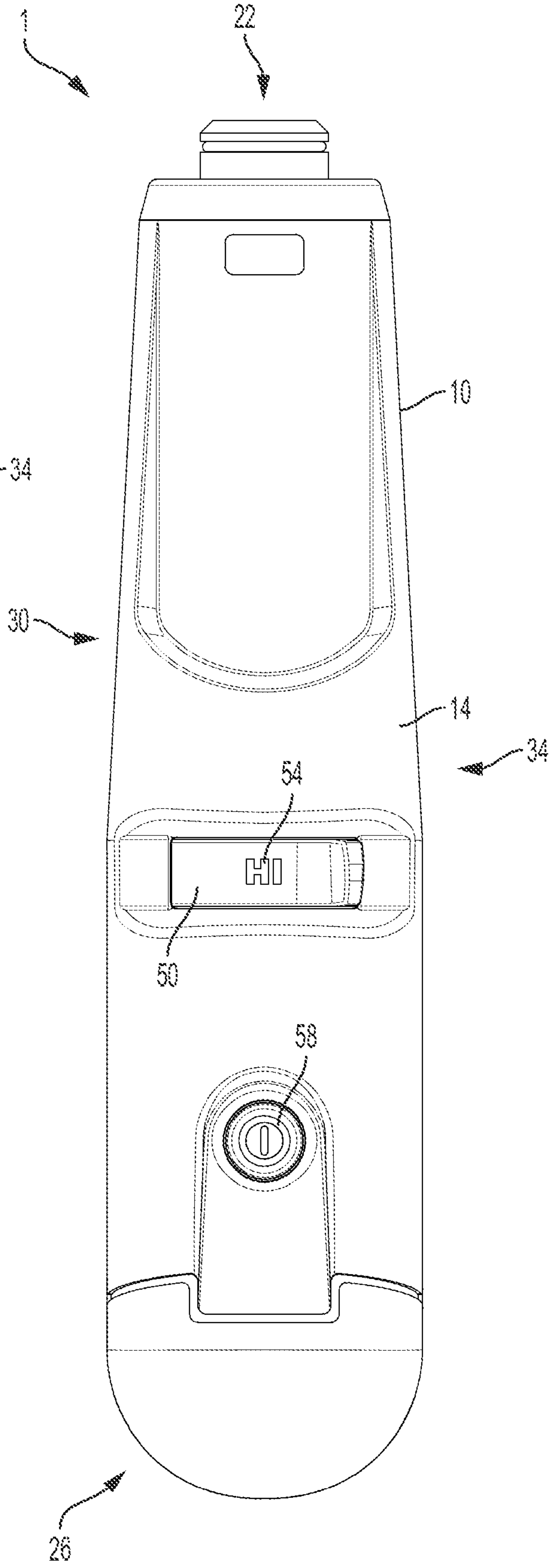
FIG. 3 is front view of the punchdown tool of FIG. 2 with the force impact switch in a second position.

With reference to FIGS. 2 and 3, a force impact switch 50 protrudes from the front housing 14 and is configured to rotate between two impact settings. In other embodiments, the force impact switch has more than two impact settings. Further, the force impact switch 50 can be moved from a first position (FIG. 2), more proximate the first lateral side 30 of the housing 10, to a second position (FIG. 3), more proximate the second lateral side 34 of the housing 10. The first position correlates to a low impact mode and the second position correlates to a high impact mode. When the force impact switch 50 is in the first position, the force delivered from the punchdown impact tool to a work surface is low. Also, when the force impact switch 50 is in the first position, indicium 54 indicating the force impact setting is shown. When the force impact switch 50 is in the second position, the force delivered from the punchdown tool to a work surface is high. Also, when the force impact switch 50 is in the second position, indicium 54 indicating the force impact setting is shown. To change the force impact setting, a user can apply a force to the force impact switch 50 to move the switch 50 from the first position to the second position and vice-versa.

In the illustrated embodiment, a light activation button 58 (FIGS. 2 and 3) is positioned on the front housing 14 proximate the rear end 26 of the housing 10 to activate the lights 38. When a user presses the light activation button 58, the lights 38 turns on and the controller 36 keeps the lights 38 on for a predetermined time period before shutting off the lights 38. In the illustrated embodiment, the predetermined time period is fifteen minutes. In other embodiments, the predetermined time period can be within a range of approximately ten seconds to thirty minutes. In further embodiments, the light activation button 58 does not include a timer and simply turn the lights 38 on and off. In addition, the controller 36 may control a blinking mode in which the lights 38 turn on and off continuously. Specifically, the controller 36 may blink the lights 38 three times when the lights 38 are turned on before continuing to stay on.

Figure 6:
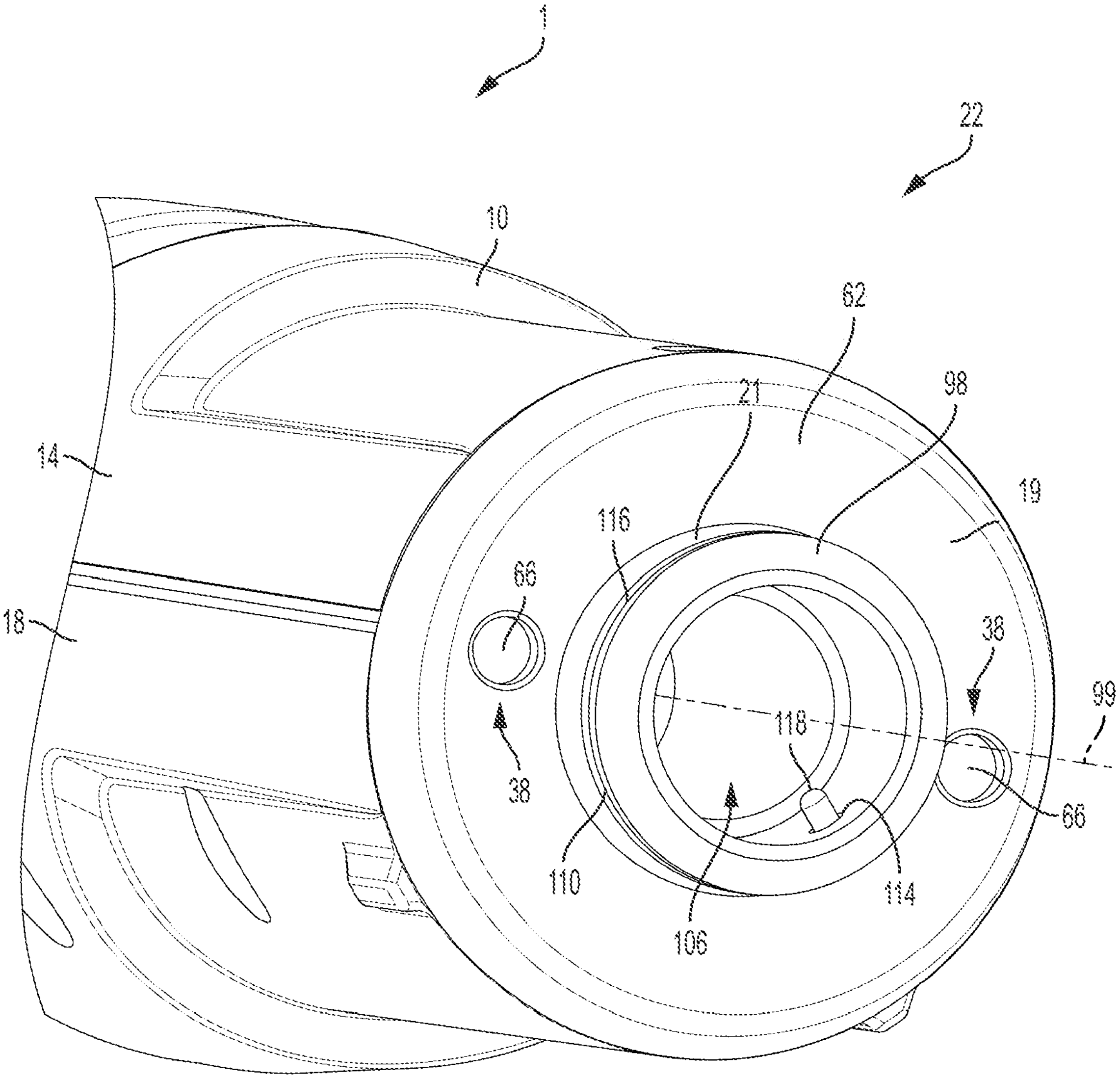
FIG. 6 is a front perspective view of the punchdown tool of FIG. 2 detailing a front end.

With reference to FIG. 6, the light 38 is located on a leading surface 62 of the nose cone 19 at the front end 22 of the housing 10. In the illustrated embodiment, there are two lights 38 (e.g., light emitting diodes, LEDs 66) that extend into the leading surface 62 and into the housing 10 of the punchdown tool 1. The LEDs 66 project light onto a work surface to assist a user in seeing while operating the punchdown tool 1. In alternative embodiments, the light 38 may include any number of LEDs 66 positioned about the leading surface 62. Due to the nose cone 19 housing the lights 38, the nose cone 19 extends further into the interior 174 (FIG. 10) of the housing 10.

With reference to FIGS. 4 and 5, a battery slot 70 is positioned on the back housing 18 proximate the rear end 26 and is configured to house two alkaline batteries 74 (FIG. 5). In the illustrated embodiment, the battery slot 70 is configured to receive two AAA or LR03 batteries 74. In other embodiments, the battery slot 70 can be configured to receive any size battery 74. In even further embodiments, the battery slot 70 can be configured to include any amount of batteries 74. The battery slot 70 further includes two electrical contacts (e.g., a first electrical contact 78 and a second electrical contact 82) for the batteries 74 to contact and supply power to the controller 36 and the light 38. The first electrical contact 78 is positioned in the battery slot 70 more proximate the rear end 26 of the housing 10 and the second electrical contact 82 is positioned in the battery slot 70 more proximate the front end 22 of the housing 10. Each electrical contact 78, 82 has a positive connection 86 and a negative connection 90 for corresponding ends of the batteries 74. Additionally, a battery cover (not shown) is configured to be received inside recesses 94 inside the battery slot 70 to protect the batteries 74.

The punchdown tool 1 also has a low battery warning feature controlled by the controller 36. If a user presses the light activation button 58 when the batteries 74 are below 25% power, the controller 36 flashes the LEDs 66 three times before the lights 38 remains turned on.

With reference to FIG. 6, a barrel 98 protrudes from the opening 21 of the nose cone 19 at the front end 22 of the housing 10 and is configured to receive an insert 100. The barrel 98 defines an impact axis 99 that extends centrally through the barrel 98 and thus the punchdown tool 1 between the front and rear end 22, 26 of the housing 10. The barrel has a receiver 106 for an insert 100 to be secured in and a channel 110 that extends around the entire outside of the barrel 98. A slot 114 is positioned in the channel 110 and extends from the channel 110 to the receiver 106 of the barrel 98. Further, a guide 116 is configured to extend the entire channel 110 with an end portion 118 protruding through the slot 114 and into the receiver 106 of the barrel 98.

Figure 7:
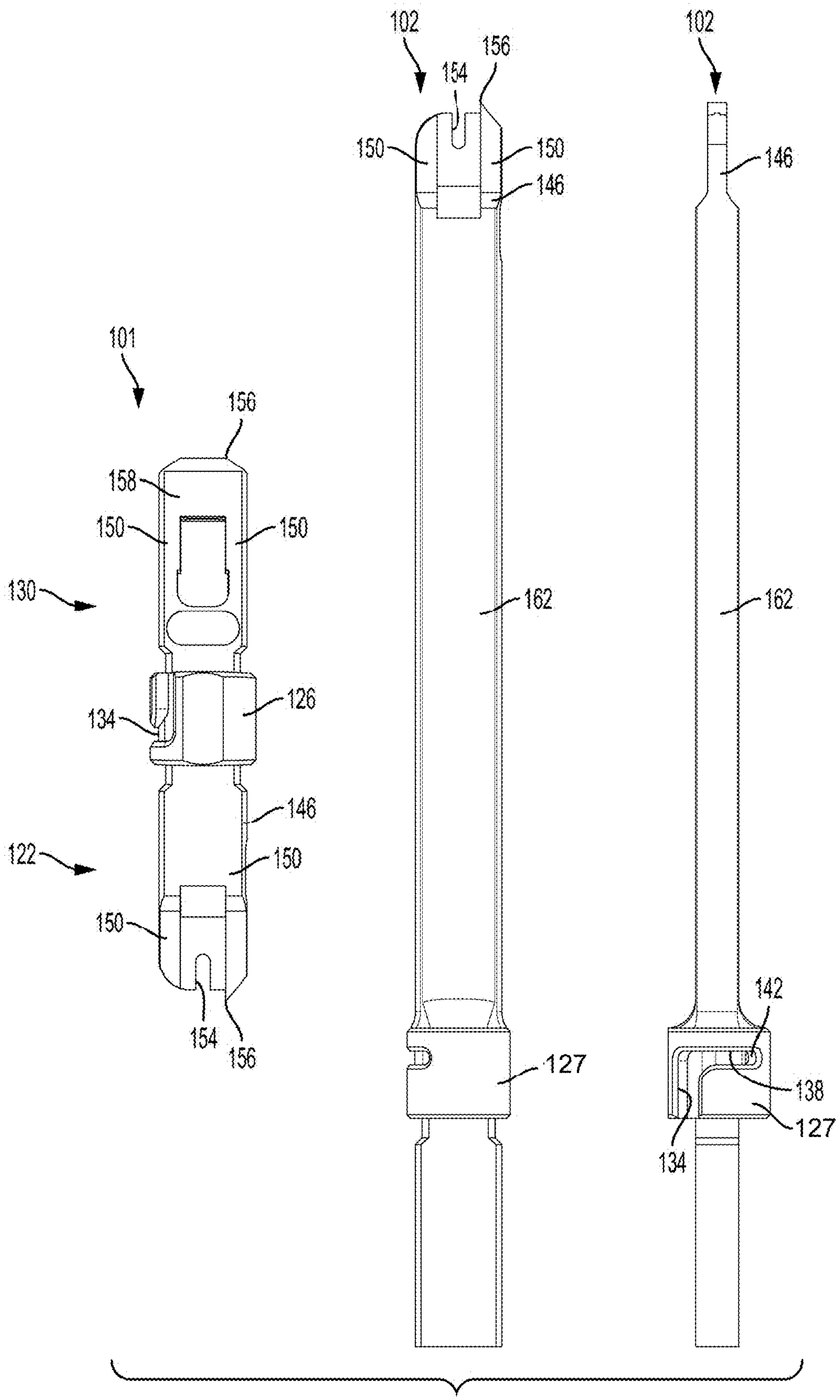
FIG. 7 shows views of exemplary inserts for the punchdown tool of FIG. 2.

With reference to FIG. 7, two exemplary inserts (e.g., a first insert 101 and a second insert 102) are shown that are intended to be received in the receiver 106 of the barrel 98. The first insert 101 is reversible and has a first extension 122 protruding from a mounting block 126 and a second extension 130 protruding from the mounting block 126 in the opposite direction as the first extension 122. The mounting block 126 has a circular cross-section and two grooves 134 on opposite sides of the mounting block 126. At the bottom of each groove 134 is a cam surface 138 with a depression 142. The first extension 122 of the first insert 101 includes a wire engaging head 146 with two arms 150. Between the arms 150 of the wire engaging head 146 is a socket 154 configured to receive an electrical wire connector. One arm 150 of the wire engaging head 146 has a cutting edge 156 intended to cut electrical wires to an appropriate length. The second extension 130 of the first insert 101 includes two arms 150 and a bridge 158 to connect the two arms 150. A cutting edge 156 is located on the bridge 158 to cut wires to the appropriate length. The second insert 11 has a mounting block 127 similar to the mounting block 126 of the first insert 101, with grooves 134, cam surfaces 138, and depressions 142. The second insert 11 has an elongated shaft 162 with a wire engaging head 146 at the end, similar to the wire engaging head 146 of the first extension 122 of the first insert 101. In the illustrated embodiment, the first insert 101 is a reversible 66/110 bit, and the second insert 102 is a 110 bit. In other embodiments, the barrel 98 could be configured to receive differently sized inserts 100. In further embodiments, the barrel 98 could be configured to receive any variety of tool bits.

In the illustrated embodiment, a user may attach an insert 100, by placing a mounting block 126, 127 of a respective insert 101, 102 within the receiver 106 of the barrel 98 and rotating the insert 100 relative to the barrel 98. The end portion 118 of the guide 116 will engage one of the grooves 134 of the insert 100 and as the barrel 98 is rotated the cam surface 138 at the bottom of one of the grooves 134, forces the guide 116 radially outward until the wire reaches the depression 142 at the end of the groove 34, in which the guide 116 is allowed to move back radially inwards to hold the insert 100 in place.

Figure 8:
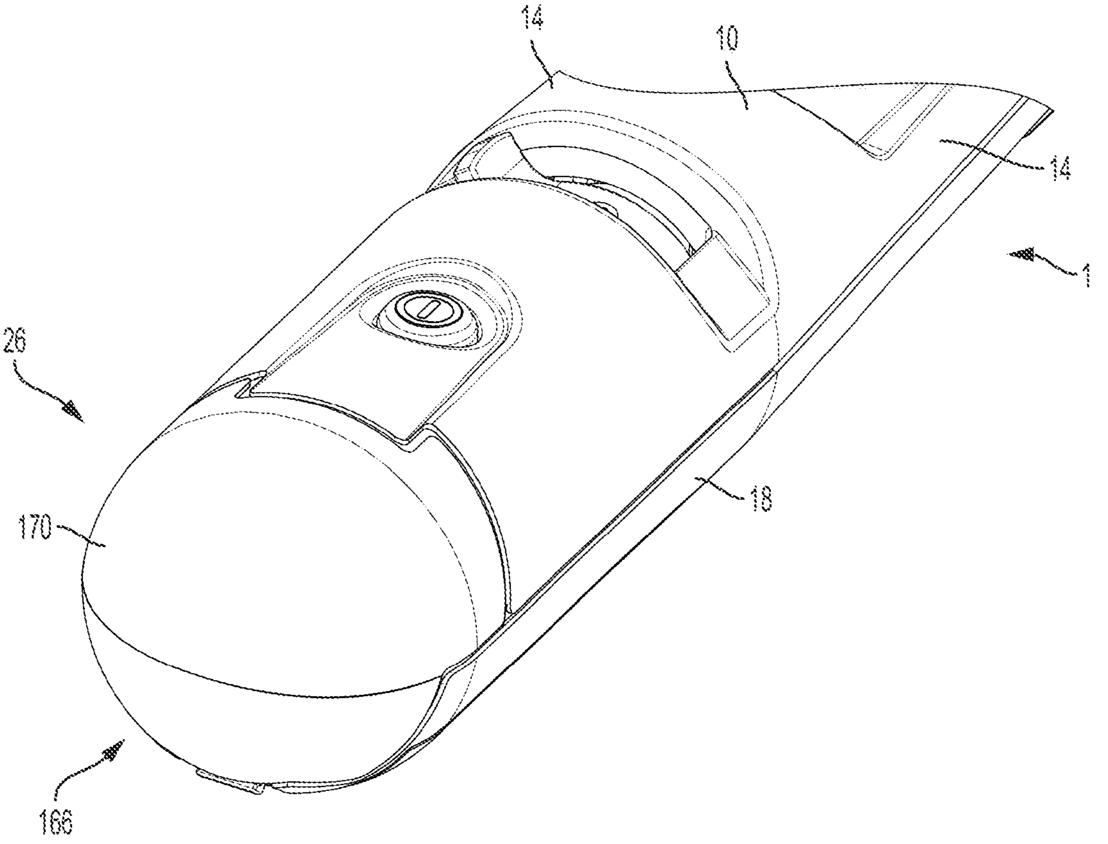
FIG. 8 is a perspective view of the punchdown tool of FIG. 2.
Figure 9:
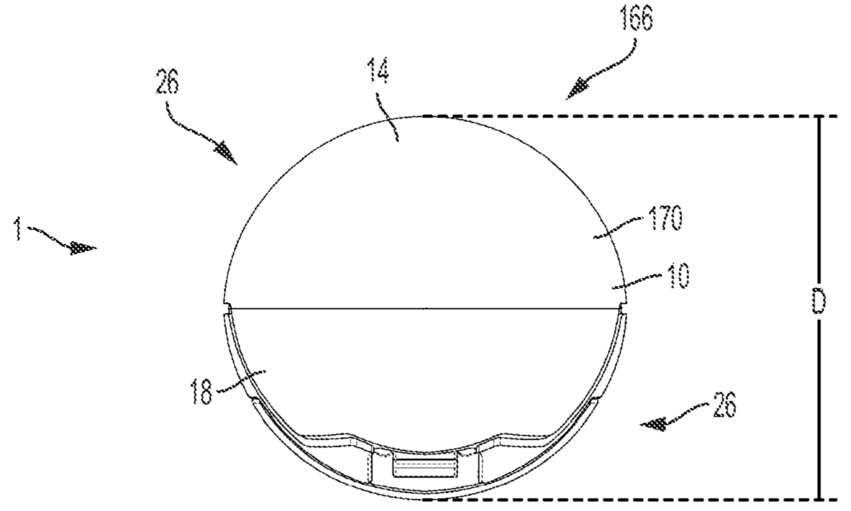
FIG. 9 is an end view of the punchdown tool of FIG. 2.

With reference to FIGS. 8 and 9, at the rear end 26 of the housing 10 is a lobe 166. The lobe 166 is spherical in shape and has a smooth surface 170. The shape and size of the lobe 166 allows for a comfortable place for a user to place their 166 hand during operation of the punchdown tool 1. By placing their hand on the lobe, a user can reduce the repetitive stress caused by the movement of the punchdown tool 1. As shown in FIG. 9, the lobe 166 defines a max diameter D of the punchdown tool 1. The max diameter D may be between approximately 30 millimeters and approximately 40 millimeters. In some embodiments, the max diameter D is 36 millimeters.

Figure 10:
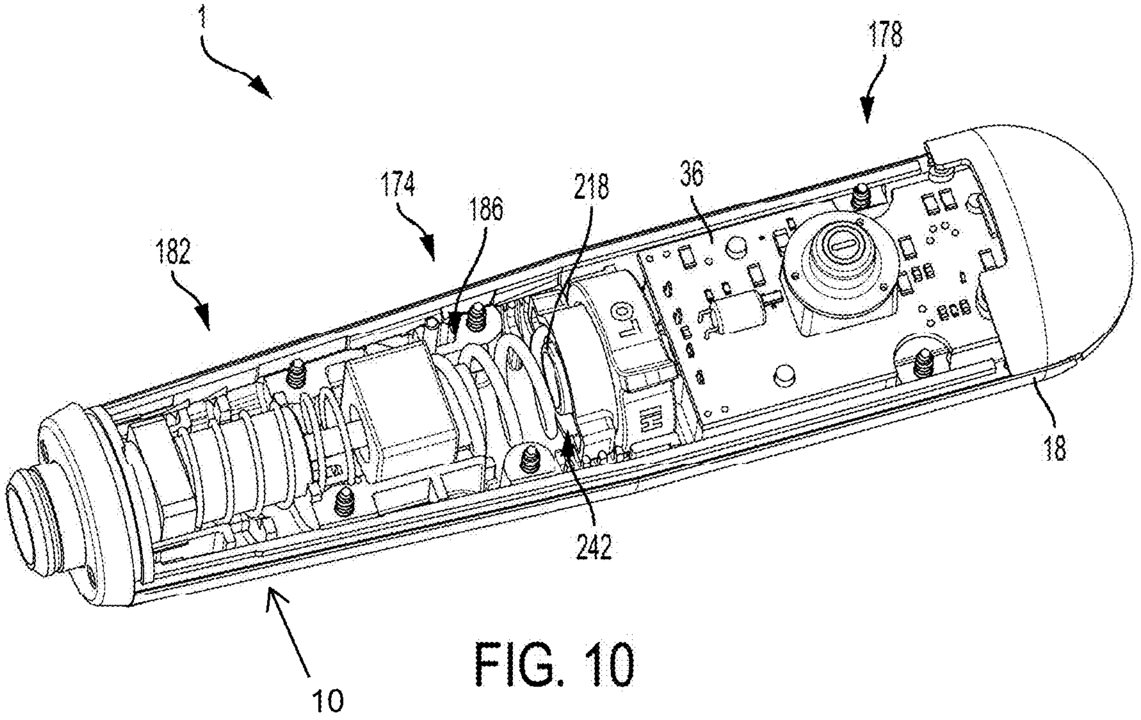
FIG. 10 is a perspective view of the punchdown tool of FIG. 2 with a front housing removed.

With reference to FIG. 10, the front housing 14 is removable from the back housing 18. The front and back housings 14, 18 define an interior 174 that includes a first compartment 178 and a second compartment 182. The first compartment 178 houses the controller 36 along with other electrical components (e.g., wires, circuit boards, etc.) and the battery slot 70 (FIGS. 4 and 5) with the batteries 74. The second compartment 182 houses a drive mechanism 186. The first compartment 178 and the second compartment 182 are compact and contain the controller 36, battery slot 70, and the drive mechanism 186 while not further enlarging the housing 10.

Figure 11:
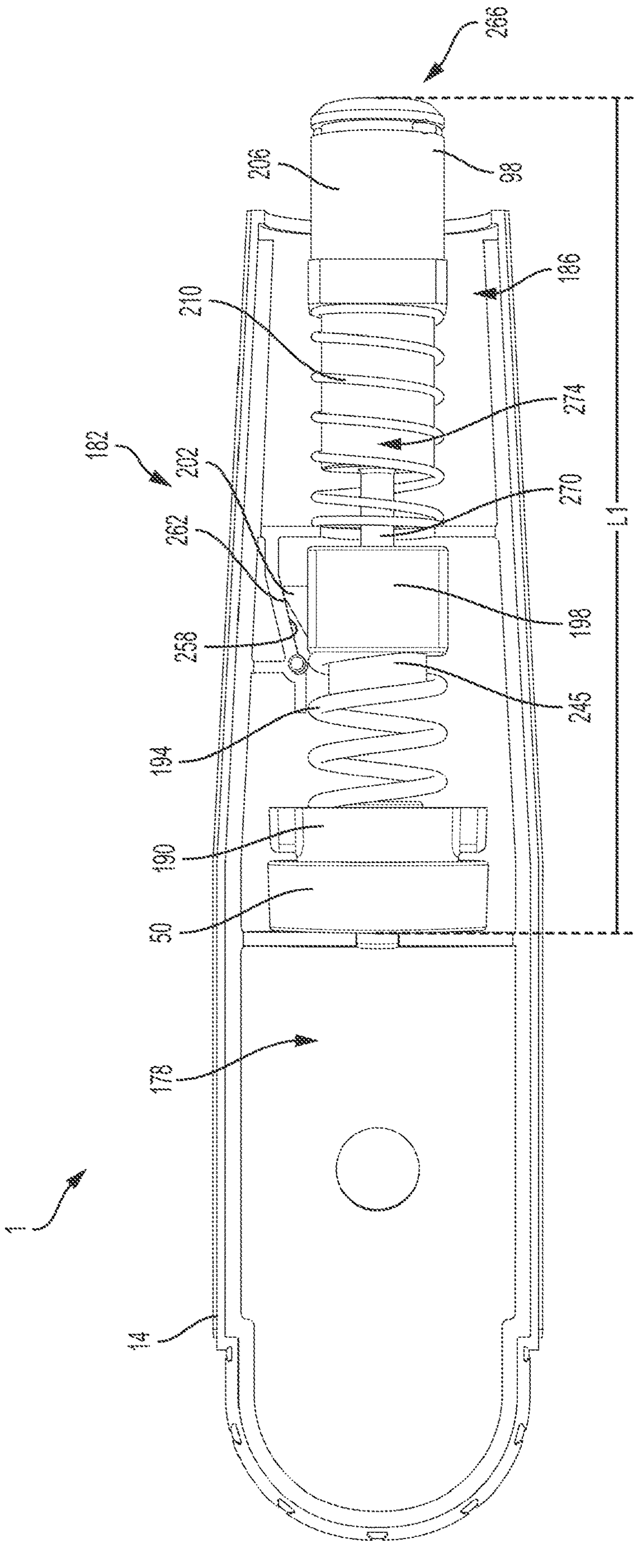
FIG. 11 is a perspective view of the punchdown tool of FIG. 2 with a back housing removed detailing a drive mechanism in an unloaded position.

As shown in FIG. 11, the drive mechanism 186, in order to fit in the same housing 10 as the controller 36 and battery slot 70, is compressed to the second compartment 182. The drive mechanism 186 includes the impact switch 50, a cam member 190, a drive spring 194, a hammer 198, a slide 202, an anvil 206, and a return spring 210 positioned between the hammer 198 and the anvil 206. In other embodiments, other suitable types of drive mechanisms are possible such as an impact mechanism used in an automatic center punch, an Adell & Starrett mechanism, a Frey mechanism, etc. A maximum length L1 of the drive mechanism 186 is defined in a direction parallel to the impact axis 99 from the tip of the barrel 98 to the impact switch 50. In the illustrated embodiment, the maximum length L1 of the drive mechanism 186 (e.g., when not compressed) is within a range from 90 millimeters to 100 millimeters. In some embodiments, the length L1 is 96 millimeters. As such, a ratio of the overall length L of the impact tool to the length L1 of the drive mechanism 186 is within a range between approximately 1.5 and 2.0.

Figure 12:
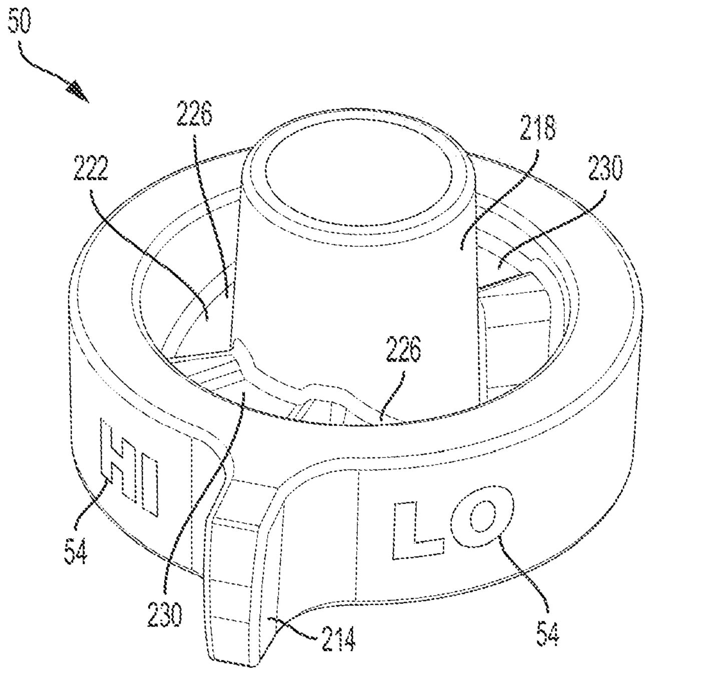
FIG. 12 is a perspective view of a switch of the punchdown tool of FIG. 2.
Figure 13:
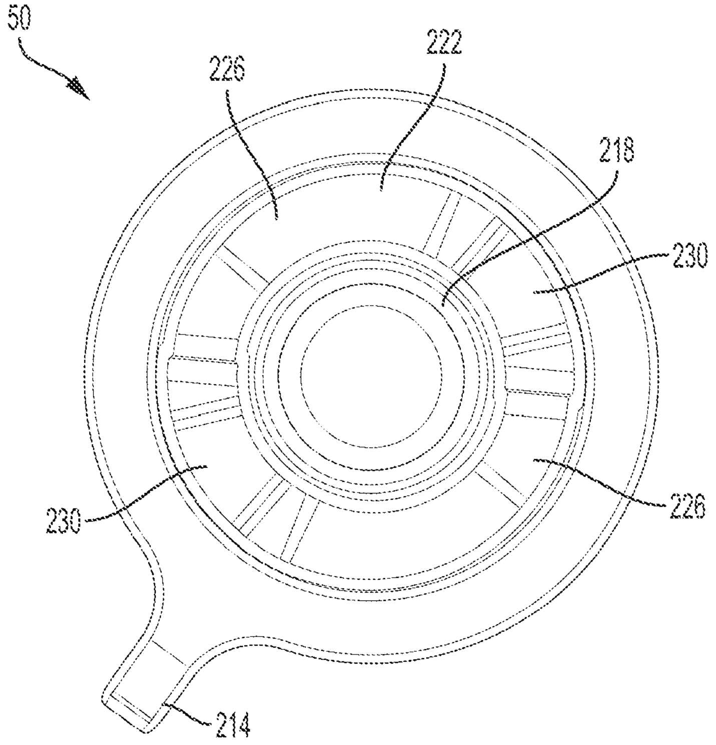
FIG. 13 is a top view of the switch of FIG. 12.

With reference to FIGS. 12 and 13, the impact switch 50 is generally circular and includes a lever 214 extending from an outer periphery, a spring support 218, and a cam seat 222 for the cam member 190 to be positioned on. The cam seat 222 includes two cam surfaces 226 that are ramped up into two catches 230. The two cam surfaces 226 are positioned on opposite sides of the cam seat 222, similarly, the two catches 230 are also on opposite sides from one another. As discussed above, the impact switch 50 is rotatable about the impact axis 99 between a first position and a second position.

Figure 14:
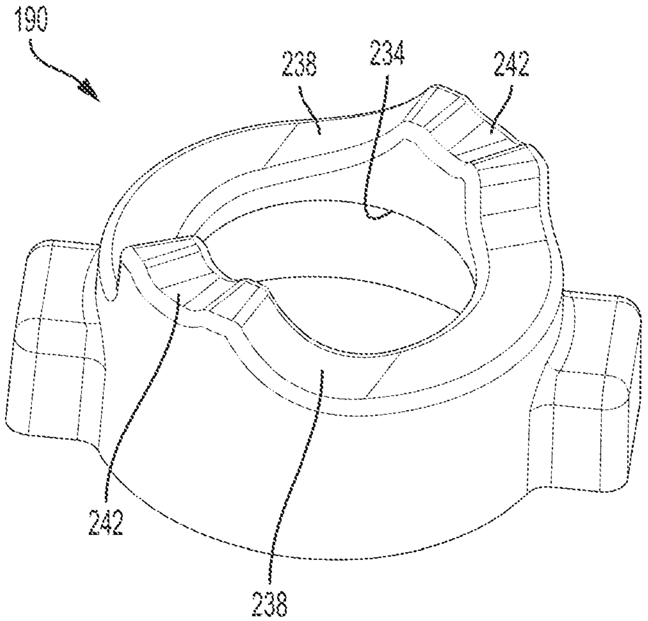
FIG. 14 is a perspective view of a cam member of the punchdown tool of FIG. 2.

In the illustrated embodiment, the cam member 190 is positioned on the cam seat 222 of the impact switch 50 with the spring support 218 extending through a central aperture 234 (FIG. 14) of the cam member 190. With reference to FIG. 14, the cam member 190 includes two cam surfaces 238 that are ramped into two catches 242. The two cam surfaces 238 are positioned on opposite sides of the cam member 190, similarly, the two catches 242 are also on opposite sides from one another. The cam member 190 further includes a spring seat 244 (FIG. 10) on an opposite side of the cam surfaces 238 and catches 242.

The cam member 190 is positioned in the cam seat 222 of the impact switch 50 so that the catches 242 of the cam member 190 are positioned on the cam surfaces 226 of the impact switch 50 and the catches 230 of the impact switch 50 are positioned on the cam surfaces 238 of the cam member 190 when the impact switch 50 is in the first position. Rotating of the impact switch 50 from the first position to the second position causes the catches 230, 242 to rotate along the ramps of the cam surfaces 226, 238 and interlock. Due to the catches 230, 242 being interlocked, when the impact switch 50 is in the second position, the cam member 190 and the spring seat 244 are positioned further towards the front end 26 of the housing 10 along the impact axis 99 than when the impact switch 50 is in the first position.

In the illustrated embodiment, the drive spring 194 is a compressible spring that extends between the cam member 190 and the hammer 198. One end of the drive spring is positioned around the spring support 218 of the impact switch 50 and seated in the spring seat 244 of the cam member 190 and the other end is positioned on a spring seat 245 (FIG. 11) of the hammer 198. When the impact switch 50 is in the second position, the drive spring 194 has shorter length and therefore is compressed more than when the impact switch 50 is in the first position due to the cam seat of the cam member 190 being positioned further towards the front end 22 of the housing 10.

Figure 15:
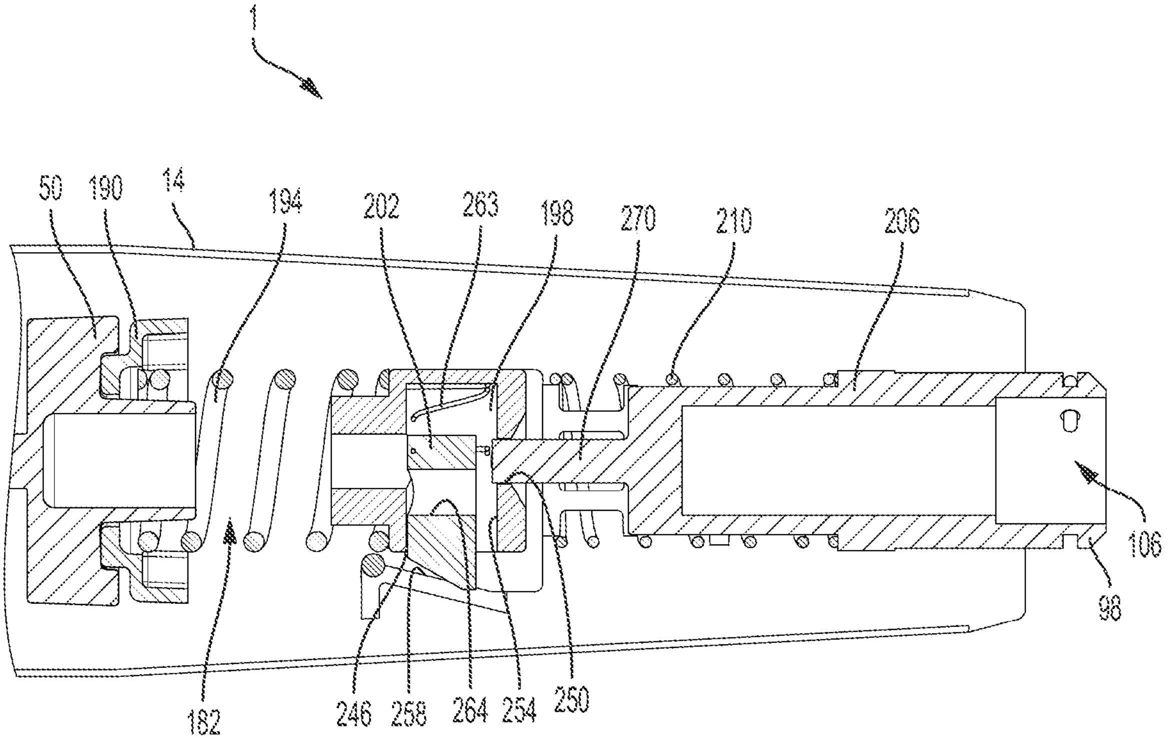
FIG. 15 is a cross-section view of the punchdown tool of FIG. 2.

With reference to FIG. 15, the hammer 198 includes a first opening 246 on the bottom side as viewed from FIG. 15 and a second opening 250 on a right side. In other embodiments, the first and second openings 246, 250 may be positioned on other sides of the hammer. The first and second openings 246, 250 lead into a cavity 254 that houses the slide 202. The slide 202 partially extends from the first opening 246 towards a ramped surface 258 inside the second compartment 182. A corresponding ramped surface 262 is provided on the slide 202. The slide 202 further includes a slide spring 263 positioned in the cavity 254 of the hammer 198 that biases the ramped surface 262 of the slide 202 to engage the ramped surface 258 of the second compartment 182. An aperture 264 is positioned on the bottom side of the slide 202 that when a force is applied against the bias of the slide spring 263, aligns with the second opening 250 of the hammer 198.

Figure 16:
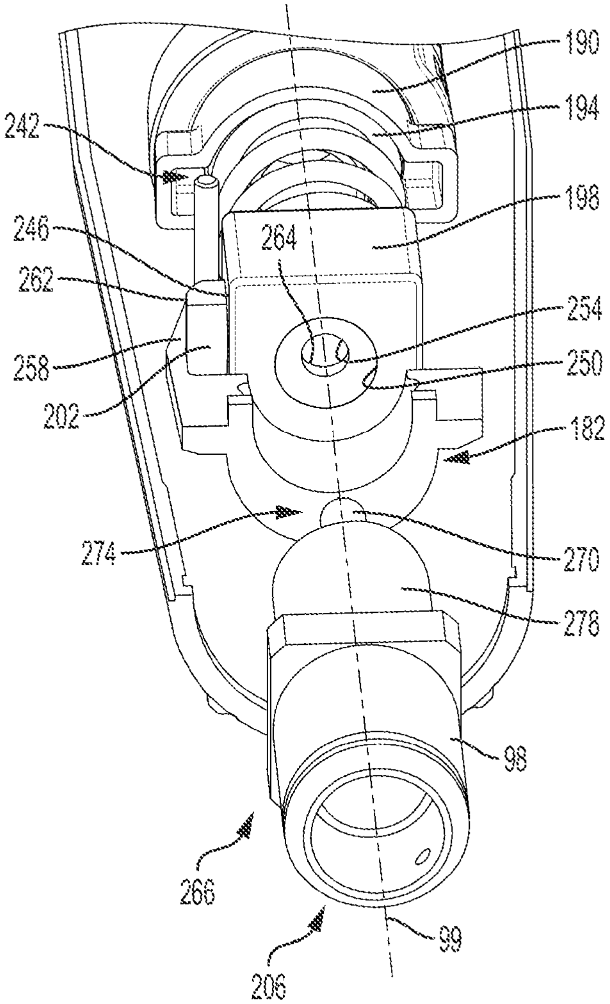
FIG. 16 is perspective view of the punchdown tool of FIG. 2 with a back housing removed.

With reference to FIG. 16, the anvil 206 is cylindrical and includes the barrel 98 at a first end 266, a pin 270 at a second end 274 opposite the first end 266 that corresponds to the second opening 250 of the hammer 198, and an impact portion 278. The pin 270 is positioned within the second opening 250 of the hammer 198 and rests against the bottom side of the slide 202. The hammer 198, the slide 202, and the anvil 206 are all movable along the impact axis 99.

Figure 17:
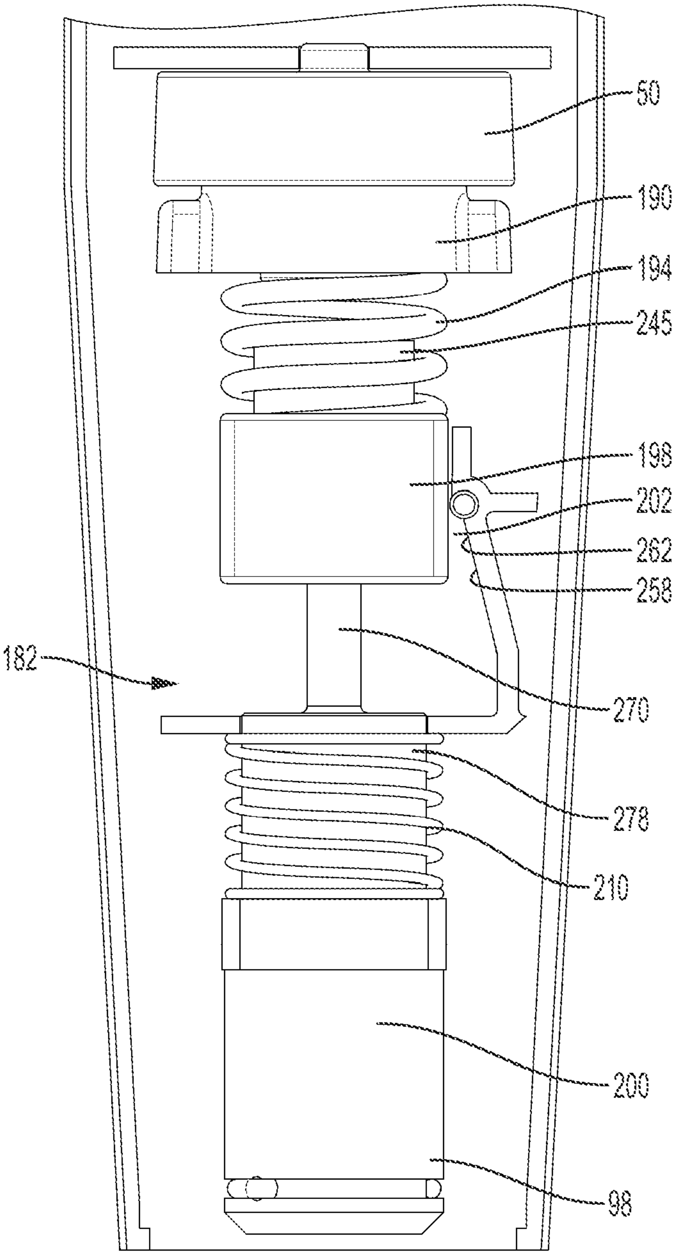
FIG. 17 is a perspective view of the punchdown tool of FIG. 2 with a back housing removed detailing the drive mechanism in a loaded position

In the illustrated embodiment, the illustrated drive mechanism 186 is movable from a unloaded position (FIG. 11) in which the hammer 198 is at its closest position to the front end 22 of the housing 10 (e.g., before a user begins to push down on the punchdown tool) and a loaded position (FIG. 17) in which the hammer 198 is at its furthest position away from the front end 22 of the housing 10 (e.g., before the drive mechanism 186 is released to make an impact).

In order for the driver mechanism 186 to fit into the second compartment 182, the drive spring 194 is short and has a high stiffness. Additionally, to prolong the life of the drive spring 194, the drive spring 194 is never fully free (i.e., not compressed at all) or fully loaded (i.e., coils of the drive spring 194 touching). As such, when the impact switch 50 is in the low impact mode and the drive mechanism 186 is unloaded, the drive spring 194 instills a minimum compression to just slightly compress the drive spring 194. Similarly, when the impact switch 50 is in the high impact mode and the drive mechanism 186 is loaded, the drive spring 194 instills a maximum compression that is slightly less than being fully loaded.

During operation of the punchdown tool 1, a user may rotate the impact switch 50 to either the first position for a low impact mode or the second position for a high impact mode. In the high impact mode, the drive spring 194 is preloaded with a higher tension force than when in a low impact mode. A user then places a wire into an electrical connector and places the socket 154 of the insert 100 on the electrical connector so that the socket 154 is transverse to the length of the wire (i.e., the flat side of the engaging head 146 is parallel to the length of the wire). The drive mechanism 186 starts in the unloaded position and as a user pushes the punchdown tool 1 down, the anvil 206 moves towards the rear end 26 of the impact tool 1 causing the pin 270 to push the slide 202 and the hammer 198 axially along the impact axis 99 towards the rear end 26. As the hammer 198 and slide 202 moves, the ramped surface 262 of the slide 202 engages and starts to move along the ramped surface 258 of the second compartment 182 of the housing 10. Meanwhile, movement of the hammer 198 compresses the drive spring 194 to build the compressive force. The engagement of the ramped surfaces 258, 262 pushes the slide 202 against the bias of the slide spring 263 aligning the second opening 250 of the hammer 198 with the aperture 264 of the slide 202 and allowing the pin 270 to enter the aperture 264. Just before the pin 270 enters the aperture 264 the drive mechanism is in the loaded position and the barrel 98 of the anvil 206 is fully retracted within the nose cone 19. Once the aperture 264 and the second opening 250 align and the pin 270 enters the aperture 264, the compressive force of the drive spring 194 drives the hammer 198 in in a direction along the impact axis 99 towards the anvil 206 and along the pin 270. The hammer 198 then impacts the impact portion 278 of the anvil 206 causing the anvil 206 to strike the insert 100, thus striking the wire and fitting it into the electrical connector. After the pushdown tool 1 impacts the wire, the return spring 210 biases the pin 270 out of the aperture 264 in the slide 202 so that another impact operation may be performed.

Providing a punchdown tool with a compressed drive mechanism positioned in the interior of the housing advantageously allows a light that requires a controller and batteries to be stored within the interior of that housing without adding to the overall bulk of the tool. Additionally, providing the light with batteries and a controller in the punchdown tool, allows the punchdown tool to be used in the dark. Further, providing a housing with a lobe section reduces the stress on a user from repetitive use.

Various features and advantages of the invention are set forth in the following claims.

What is claimed is:

1. A punchdown tool comprising:

a housing that defines an impact axis that extends through the housing in a longitudinal direction, the housing including a front end and a rear end opposite the front end;

a drive mechanism positioned in the housing, the drive mechanism movable between an unloaded position and a loaded position, the drive mechanism including a hammer movable along the impact axis; and an anvil movable along the impact axis, the anvil including a barrel;

wherein, when the drive mechanism is in the loaded position, the barrel of the anvil does not extend beyond the front end of the housing, wherein a ratio is defined as a total length of the punchdown tool in a direction parallel to the impact axis divided by a total length of the drive mechanism in a direction parallel to the impact axis, and wherein the ratio is in a range from 1.5 to 2.0.

2. The punchdown tool of claim 1, wherein the housing defines a maximum diameter of the punchdown tool that is within a range from 30 millimeters to 40 millimeters.

3. The punchdown tool of claim 2, wherein a length defined between the front end and the rear end of the housing is within a range from 150 millimeters to 180 millimeters.

4. The punchdown tool of claim 2, wherein the rear end of the housing includes a lobe that defines the maximum diameter of the housing.

5. The punchdown tool of claim 1, the housing comprising an interior between the front end and the rear end, the punchdown tool comprising a light positioned on a leading surface of the housing.

6. The punchdown tool of claim 5, the punchdown tool comprising a circuit board positioned in the interior of the housing, the circuit board including a controller electrically coupled to the light.

7. The punchdown tool of claim 5, comprising a battery positioned in the interior of the housing for supplying power to the light.

8. The punchdown tool of claim 1, comprising an insert coupled to the barrel, wherein, when the drive mechanism is in the loaded position, the insert partially extends into the housing.

* * * * *